United States Patent

Ohnishi et al.

[11] 4,323,906
[45] Apr. 6, 1982

[54] DEVICE FOR CORRECTING PITCH OF SCANNING LINES IN A LIGHT BEAM RECORDING SYSTEM

[75] Inventors: Masahiro Ohnishi; Tsutomu Kimura, both of Asaka, Japan

[73] Assignee: Fuji Photo Film Co., Ltd., Minami-ashigara, Japan

[21] Appl. No.: 172,249

[22] Filed: Jul. 25, 1980

[30] Foreign Application Priority Data

Jul. 26, 1979 [JP] Japan .................................. 54-95359

[51] Int. Cl.³ ........................ G01D 15/10; G01D 9/42
[52] U.S. Cl. .................................... 346/76 L; 346/108
[58] Field of Search ............................... 346/107–110, 346/76 L

[56] References Cited

U.S. PATENT DOCUMENTS 3,448,458 6/1969 Carlson et al. ............... 346/76 L X
3,999,010 12/1976 Oosaka et al. ................ 346/76 L X
4,002,829 1/1977 Hutchison ..................... 346/76 L X Primary Examiner—Donald A. Griffin
Attorney, Agent, or Firm—Fleit & Jacobson

[57] ABSTRACT

In a laser beam scanning type image recording system in which a laser beam is deflected horizontally and vertically to perform raster scanning on a recording material, a linear encoder for making a photoelectric pulse signal is provided with an optical mark in the vicinity of the end portion of the raster scanning so that the laser beam crosses the optical mark. The number of the scanning lines crossing the optical mark is counted to detect the fluctuation in amplitude of vibration of a vibrating mirror for vertically deflecting the laser beam. The gain of a driving circuit for driving the vibrating mirror is controlled according to the counted number of the scanning lines crossing the optical mark.

2 Claims, 6 Drawing Figures

DEVICE FOR CORRECTING PITCH OF SCANNING LINES IN A LIGHT BEAM RECORDING SYSTEM

BACKGROUND OF THE INVENTION

1. Field of the Invention

This invention relates to a light beam recording system for recording an image on a recording material by scanning the recording material with a light beam, and more particularly to a device for correcting the pitch of the scanning lines by correcting the vibration of the vibrating mirror for vertical deflection of the light beam in the light beam recording system.

2. Description of the Prior Art

A light beam scanning type image recording system is used for instance in a laser COM (computer output microfilmer) which records the output data of a computer on a microfilm. The laser COM uses a laser beam for recording the image on a recording material such as a heat-mode recording film. Further, in the laser COM, there is used a two-dimensional light deflecting system which deflects a read-out light beam and a recording light beam having different wavelengths. The two-dimensional light deflecting system employs a rotating polygonal mirror for horizontal deflection and a vibrating mirror for vertical deflection such as a galvanometer mirror.

The galvanometer mirror has a defect in that the amplitude thereof changes as the temperature changes. When a galvanometer mirror is used for vertically deflecting the light beam, therefore, the pitch of the scanning lines or the intervals between the scanning lines are reduced as the temperature rises. The reduction of the pitch results in compression in the vertical direction of the recorded image.

SUMMARY OF THE INVENTION

The primary object of the present invention is to provide a device for automatically correcting the pitch of the scanning lines caused by the fluctuation in the amplitude of vibration of the vibrating mirror in a light beam scanning type image recording system.

A more specific object of the present invention is to provide a device for correcting the pitch of the scanning lines in a light beam recording system to prevent the image recorded thereby from being compressed when the temperature of the recording system rises.

The device in accordance with the present invention employs an optical mark on a linear encoder at a position where the mark receives several scanning lines near the end of scanning in the linear encoder, counts the number of the scanning lines crossing the optical mark to detect the fluctuation in the pitch of the scanning lines, and controls the gain of the drive circuit for a galvanometer mirror according to the fluctuation detected.

When the temperature of the light recording system rises and the amplitude of vibration of the galvanometer mirror is reduced, the pitch of the scanning lines is reduced and the number of scanning lines crossing the optical mark increases. Therefore, by counting the increased number of the scanning lines, the fluctuation in the pitch of the scanning lines can be known. Thus, by varying the gain of the mirror drive circuit according to the fluctuation in the pitch of the scanning lines, the pitch can be controlled at a constant value.

DESCRIPTION OF PREFERRED EMBODIMENTS

Figure 1:
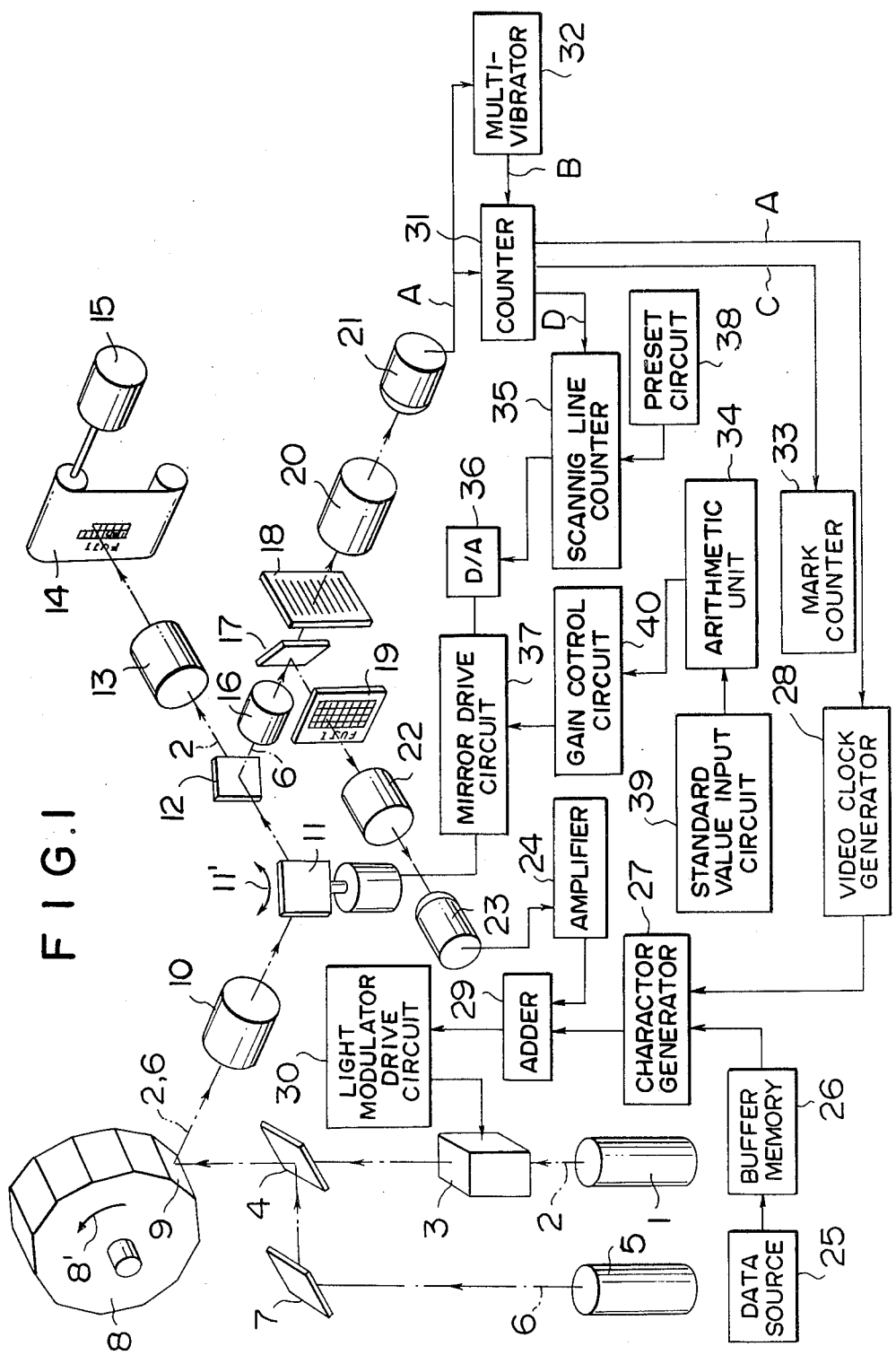
FIG. 1 is a perspective view combined with a block diagram of a light beam recording system in which the scanning line pitch correcting device of this invention is utilized.

Referring to FIG. 1, a laser beam source 1 such as an argon ion laser which emits blue and green laser beams emits a laser beam 2 for recording. The recording laser beam 2 transmits through a dichroic mirror 4 after passing through a light modulator 3 in which it is amplitude-modulated by a video signal hereinafter described. On the other hand, another laser source 5 such as a helium-neon laser which emits red laser beam emits a laser beam 6 for reading out information. The read-out laser beam 6 is reflected by a mirror 7 and then is further reflected by said dichroic mirror 4, whereby it is merged in the recording laser beam 2 and advances in the same optical path as the latter. The dichroic mirror 4 transmits blue and green light and reflects red light.

The composite laser beams 2 and 6 advancing from the dichroic mirror 4 impinge upon the reflecting surface 9 of a rotating polygonal mirror 8 rotating at a constant speed in the direction of arrow 8' and are deflected thereby. Then, the composite laser beam 2,6 advances toward a galvanometer mirror 11 through a first focusing optical system 10. The deflection performed by the rotating polygonal mirror 8 will hereinbelow be referred to as horizontal deflection. The galvanometer mirror 11 vibrates in the direction of arrow 11 by a saw tooth signal as described hereinafter and deflects the composite laser beam 2,6 in the direction perpendicular to the direction of said horizontal deflection. The deflection performed by the galvanometer mirror 8 will hereinbelow be referred to as vertical deflection. It should be noted that in FIG. 1 the rotating mirror 8 is illustrated to deflect the laser beam vertically and the galvanometer mirror 11 is illustrated to deflect the laser beam horizontally for the sake of illustration's convenience.

As the laser beam is deflected once by one reflecting surface 9 of the rotating polygonal mirror 8, the laser beam is vertically deflected by one unit by the galvanometer mirror 11. Thus, the laser beam is two-dimensionally deflected and scans by parallel scanning lines on a recording material and so forth. This scanning in a two-dimensional pattern will hereinbelow be referred to as raster scanning.

The vertically deflected laser beam composite 2,6 is then separated by another dichroic mirror 12 into a recording laser beam 2 and a read-out laser beam 6. The recording laser beam 2 transmitting through the dichroic mirror 12 is focused by a second focusing optical system 13 and scans a recording material 14 in the form of a small light spot by raster scanning. The recording material 14 is moved by a driving means 15 like a motor after the recording laser beam 2 has completed recording of one image frame by raster scanning. Thus, the recording material 14 is fed one frame by one frame each time the laser beam 2 has completed raster scanning of one frame. The driving means 15 may be of any type and is selected properly according to the type of the recording material 14 and the format of the image frames recorded thereon, e.g. a single line of image frames on roll film or two dimensional arrangement in the form of microfiche.

On the other hand, the read out laser beam 6 is reflected by the dichroic mirror 12 and focused by a third focusing optical system 16. The focused read out laser beam 6 partly transmits through a beam splitter 17 and raster-scans on a linear encoder 18 in a small light spot and partly is reflected by the beam splitter 17 and raster-scans on a form slide 19 bearing a form consisting of frame lines and characters in a small light spot.

The linear encoder 18 is a plain plate having a number of elongated transparent portions and opaque portions extending in the direction of vertical deflection arranged alternately in the direction of horizontal deflection at fixed intervals. The laser beam impinging upon the linear encoder 18 transmits through the transparent portions thereof and does not transmit through the opaque portions thereof. Therefore, a photoelectric pulse signal A can be obtained by providing a photodetector 21 behind the linear encoder 18 via a fourth focusing optical system 20 to receive the laser beam transmitting through the linear encoder 18.

The read-out laser beam reflected by the beam splitter 17 transmits through the form slide 19 at the portions free of the information of the form and does not at the portions of the information of the form. Therefore, an ON-OFF signal representing the image of the form carried by the form slide 19 can be obtained by providing a photodetector 23 behind the form slide 19 via a fifth focusing optical system 22 to receive the laser beam transmitting through the form slide 19.

The data consisting of character information and the like to be recorded are memorized in an information source 25 such as a computer, a magnetic tape or the like in the form of coded signal. The coded signal is once memorized in a buffer memory 26, and then outputed therefrom and inputed into a character generator 27 at a speed different from the speed at which the data are memorized in the buffer memory 26. The character generator 27 generates a data video signal according to the video clock signal generated from a video clock generator 28. The data video signal is composed with a form video signal at an adding circuit 29 and then put into a light modulator 3 after amplified by a light modulator driving circuit 30.

Thus, the recording laser beam 2 is modulated through the light modulator 3 by a video signal composed of the data information and the form information. The modulation is of ON-OFF type and the recording laser beam 2 records the data with the form information on the recording material 14 in the form of dots. The form video signal is obtained by amplifying the output of the photodetector 23 which represents the image of the form by means of an amplifier 24.

The video clock signal is used for giving a timing of generating a video signal so as to generate dots at equal intervals in a predetermined range of the scanning lines. For generating the video clock signal, the photoelectric pulse signal A obtained from the linear encoder having the transparent portions arranged at equal intervals is used. By counting the photoelectric pulse signal A, the scanning position of the laser beam in the horizontal deflection direction can be known. Further, by use of the photoelectric pulse signal A, the video clock pulse signal can be generated in such a way that the video signal can be recorded at equal intervals on the recording material 14 even if there is a fluctuation in rotation of the rotating polygonal mirror 8 or there is an error in the divided angles of the reflecting surfaces of the polygonal mirror 8. In order to obtain the video clock signal by inputing the photoelectric pulse signal A into the video clock signal generator 28, a PLL circuit as disclosed in a copending Japanese Patent Application No. 53(1978)-3480 may be used. By use of the circuit, a video clock signal having a multiplied frequency of the frequency of the photoelectric pulse signal A can be obtained.

Now the driving and operation of the galvanometer mirror 11 will be described. The direction of deflection by the galvanometer mirror 11 is determined by the counted value obtained by the scanning line counter 35. The counter value is given to a digital-analog converter 36, which provides an analog signal to a mirror drive circuit 37, whereby the galvanometer mirror 11 is driven to deflect the laser beam 2,6. For instance, the direction of deflection by the galvanometer mirror 11 is set to form the uppermost scanning line in the raster scanning when the counted value obtained by the counter 35 is zero. Then, as the counted value of the counter 35 is increased by the galva-up signal D hereinafter described, the galvanometer mirror 11 is rotated in proportion to the increased counted value to vertically deflect the laser beam.

In general, the galvanometer mirror 11 conducts the vertical deflection as above. When the raster scanning is completed, the scanning line counter 35 is cleared to zero and set to be ready for the subsequent raster scanning.

In order to record the information at a high speed, it is possible to commence the vertical scanning or deflection from the position of the first scanning line on which the form video signal or the data video signal is recorded without clearing the scanning line counter 35 to zero. The scanning line counter 35 is connected with a counter preset circuit 38.

Figure 2:
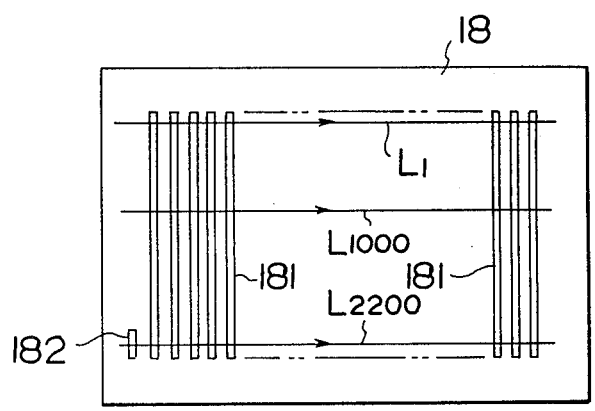
FIG. 2 is a front view of a linear encoder used in the present invention.

FIG. 2 shows the linear encoder 18 in detail. The linear encoder 18 has a number of transparent portions 181 in the form of parallel stripes arranged at equal intervals. The horizontal length of the striped area in FIG. 2 measured horizontally is a little shorter than the length of the scanning lines and the vertical length thereof measured vertically in FIG. 2 is a little longer than the length of the vertical deflecting range covered by the galvanometer mirror 11. In other words, in FIG. 2, the raster formed on the linear encoder 18 by the read-out laser beam 6 has a longer horizontal length than the striped area and a shorter vertical length than the striped area.

When the counted value of the scanning line counter 35 is zero, the first scanning line indicated at L1 is obtained by the laser beam 6. The 1000th scanning line is indicated at $L_{1000}$ and the last scanning line is indicated at $L_{2200}$.

The linear encoder 18 is provided at the lower left position thereof with a transparent optical mark 182 having a shorter vertical length than the other transparent portions 181. The optical mark 182 has a length to receive about 30 scanning lines and has sharp edges at the upper and lower ends thereof.

The number of the pulses of the photoelectric pulse signal A corresponding to the scanning line $L_{2200}$ passing through the optical mark 182 is only one larger than that of the photoelectric pulse signal A corresponding to the scanning line $L_{1000}$ which does not pass through the optical mark 182.

The photoelectric pulse signal A is put into a counter 31 from the photodetector 21 and counted thereby and also is put into a multi-vibrator 32 which can be triggered. As the multi-vibrator 32 is employed, for instance, SN74123 made of Texas Instruments Inc. The time constant of the multi-vibrator 32 is set longer than the period of the photoelectric pulse signal A.

The level of the output of the multi-vibrator 32 is returned to "L" after the previous horizontal scanning is completed and is reversed to "H" upon triggered by the first photoelectric pulse signal A of the subsequent horizontal scanning. When the output B of the multi-vibrator 32 is inputed into the counter 31 and the level thereof is turned to "L", the counter 31 is reset.

Figure 3A:
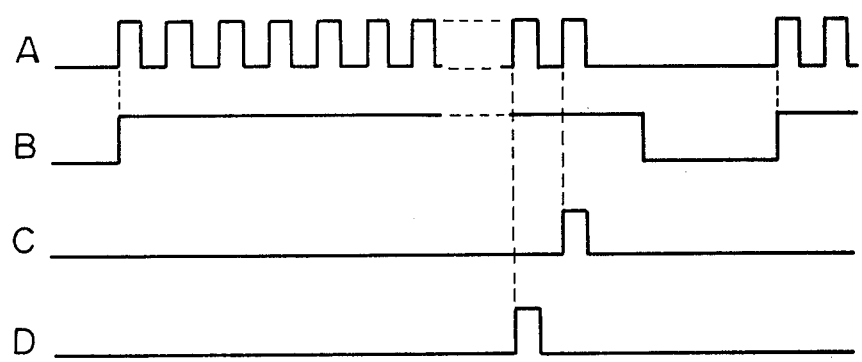
FIGS. 3A and 3B are timing charts of a counter which counts photoelectric pulses.
Figure 3B:
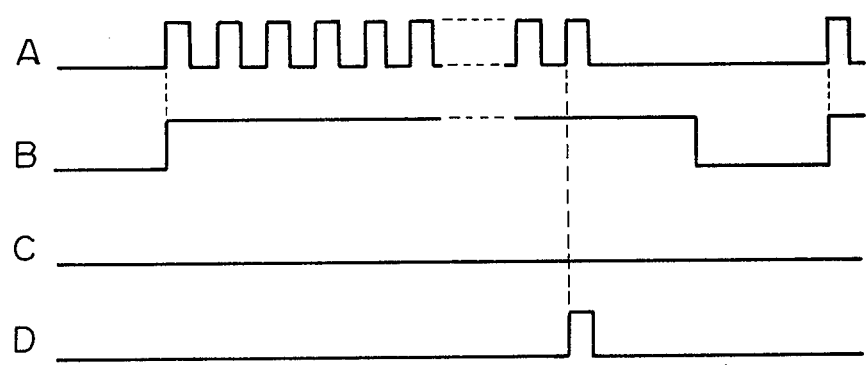

The counter 31 counts the photoelectric pulse signal A for every scanning line and outputs a galva-up signal D to the scanning line counter 35 when the scanning line passes through the optical mark 182. Further, the counter 31 outputs a mark signal C to the mark counter 33 at this time. When the scanning line or the laser beam does not pass through the optical mark 182 and transmits through the transparent portions 181 only, the counter 31 outputs only the galva-up signal D to the scanning line counter 35. In other words, the galva-up signal D is outputed when the number of the detected photoelectric pulses of the signal A reaches the number of the transparent portions 181, i.e. every time one scanning line is read out, and the mark signal C is outputed when the number of the detected photoelectric pulses of the signal A reaches the number of the transparent portions 181 plus one. The relationship between these pulse signals A, B, C and D is shown in FIGS. 3A and 3B. When the scanning line passes through the optical mark 182 as the last scanning line $L_{2200}$, signals C and D are generated as shown in FIG. 3A. When the scanning line does not pass through the optical mark 182 and only passes through the transparent portions 181 as the scanning line $L_{1000}$, only the signal D is generated as shown in FIG. 3B. In FIGS. 3A and 3B, the abscissa represents time and the ordinate represents the level of the electric signals.

In correcting the amplitude of vibration of the galvanometer mirror 11 to correct the pitch of the vertical deflection, the output signal from the counter preset counter 35 is inputed into the scanning line counter 35 with the light modulator 3 maintained turned OFF, and the counter 35 is set at a desired value.

Figure 4:
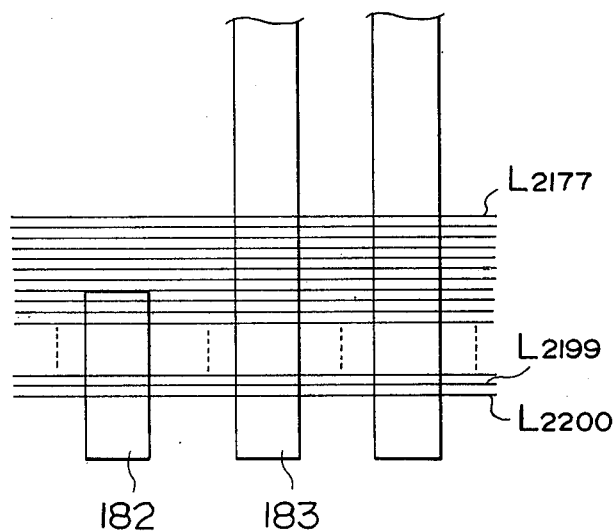
FIG. 4 is an explanatory view showing the relative relationship between the linear encoder and scanning lines.

As shown in FIG. 4, when it is assumed that 15 scanning lines are to be received by the optical mark 182 in the upper half portion of the mark 182 and the recording of information is to be completed at the scanning line of 8 lines above the upper end of the optical mark, the number of the scanning lines outside the effective image is 23. When the total number of the scanning lines is 2200, the recording is completed at the 2177th scanning line. Then, it is practically desirable to speed up the recording operation by resetting the scanning line counter 35 when the 2177th line is reached and automatically commence the recording of the subsequent image frame thereafter without scanning up to the last line $L_{2200}$. Thus, the counter 35 is preset with this number of scanning lines "2177".

Thereafter, the laser beam is two-dimensionally deflected. Then, when the laser beam crosses the optical mark 182, the counter 31 outputs the mark signal C and the signal is counted by the mark counter 33. Thus, the number N of the scanning lines crossing the optical mark 182 is counted.

When the standard number of the counted number N of the scanning lines crossing the optical mark 182 is set 15 for instance, the fluctuation of the vertical deflecting galvanometer vibration can be known from the difference between the counted number N and the standard number 15. The counted value or the number N from the mark counter 33 is sent to an arithmetic unit 34 as shown in FIG. 1 and is compared with the standard value or number 15 inputed by a standard value input circuit 39 by subtraction. The result of the subtraction at the arithmetic unit 34 is sent to a gain control circuit 40.

Figure 5:
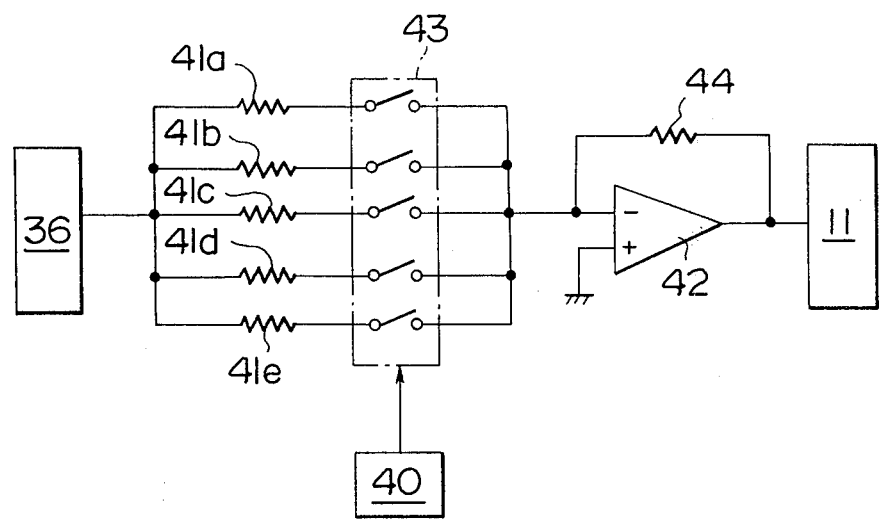
FIG. 5 is a circuit view of a gain controlling circuit.

FIG. 5 shows the gain control circuit 40 and the mirror driving circuit 37. A number of resistors 41a and 41e connected in parallel are connected with an analog switch 43. The analog switch 43 is connected with an input terminal of an operational amplifier 42. The analog switch 43 performs selective switching according to a code signal from the gain control circuit 40. By making the selective switching, the resistance ratio to the feedback resistance 44 of the operational amplifier 42 is changed and the gain of the operational amplifier 42 is changed to control the interval between the scanning lines.

Since the fluctuation in vibration of the galvanometer mirror 11 is caused by fluctuation in temperature, the amplitude of vibration of the galvanometer 11 is not abruptly changed. Therefore, the correction of the amplitude may be conducted for every 10 frames at most or for every one microfiche usually consisting of 60 frames. This can be done by counting the number of the frames or microfiche periodically by a separate counter. Further, since the correction of the amplitude of vibration can be conducted in a very short period, it is desirable to conduct the correction while the recording material 14 is moved.

The correction of the amplitude can be performed by use of a microcomputer. Therefore, by making a program of the process of amplitude correction, all the above mentioned operation or steps can be automatically conducted.

It should be noted that the position of the optical mark 182 may not be at the lower left of the linear encoder 18 but may be at the lower right thereof.

We claim:

1. A device for correcting pitch of scanning lines in a light beam recording system in which a light beam is horizontally deflected by a horizontal deflecting means and vertically deflected by a vibrating mirror, the horizontally deflected light beam scans a linear encoder to generate a photoelectric pulse signal, the number of the photoelectric pulses is counted to detect the position of the deflected light beam, the signal representing the vertically deflected position is inputed into a vibrating mirror driving circuit to rotate said vibrating mirror by predetermined angles, and the light beam thus horizontally and vertically deflected records an image of information on a recording material by raster scanning wherein the improvement comprises an optical mark provided on said linear encoder in the vicinity of the end of the raster scanning to receive a number of scanning lines, means for counting the number of the scanning lines received by said optical mark to detect fluctuation in the amplitude of said vibrating mirror, and means for controlling the gain of said vibrating mirror driving circuit according to the detected fluctuation.

2. A device as claimed in claim 1 wherein said linear encoder is a plate having a number of parallel elongated transparent portions arranged at equal intervals, and said optical mark is a transparent portion provided beside said elongated transparent portions.

* * * * *